Feb. 16, 1965

G. N. BLISS ETAL 3,169,354

EGG HANDLING AND PACKING SYSTEM

Filed May 1, 1962

INVENTORS
GEORGE N. BLISS &
GEORGE A. PAGE

BY Coleman, Nord & Krass

ATTORNEYS

INVENTORS
GEORGE. N. BLISS &
GEORGE A. PAGE

BY Colman, Nerd & Kress

ATTORNEYS

Feb. 16, 1965   G. N. BLISS ETAL   3,169,354
EGG HANDLING AND PACKING SYSTEM
Filed May 1, 1962   6 Sheets-Sheet 4

INVENTORS
GEORGE N. BLISS &
GEORGE A. PAGE

BY Colman, Ward & Kraus

ATTORNEYS

Feb. 16, 1965 G. N. BLISS ETAL 3,169,354
EGG HANDLING AND PACKING SYSTEM
Filed May 1, 1962 6 Sheets-Sheet 5
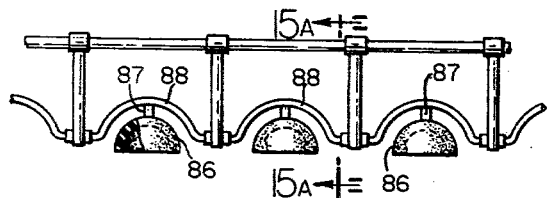
FIG. 15
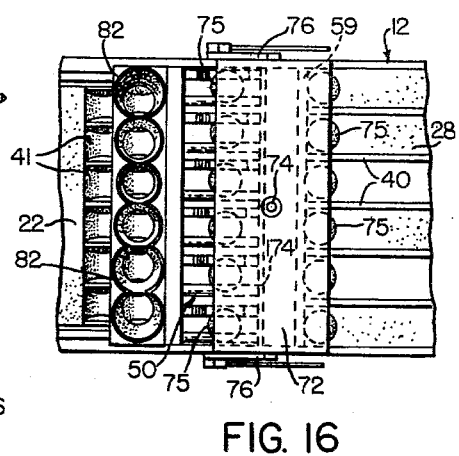
FIG. 16
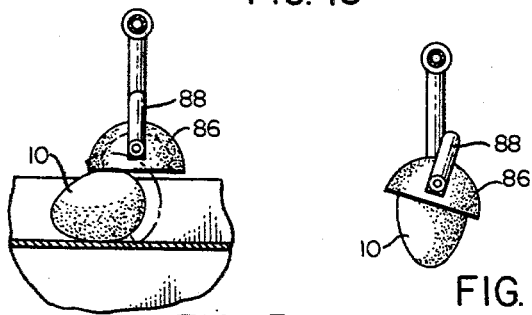
FIG. 15A
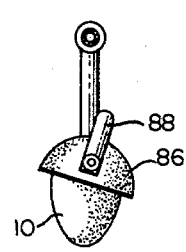
FIG. 15B
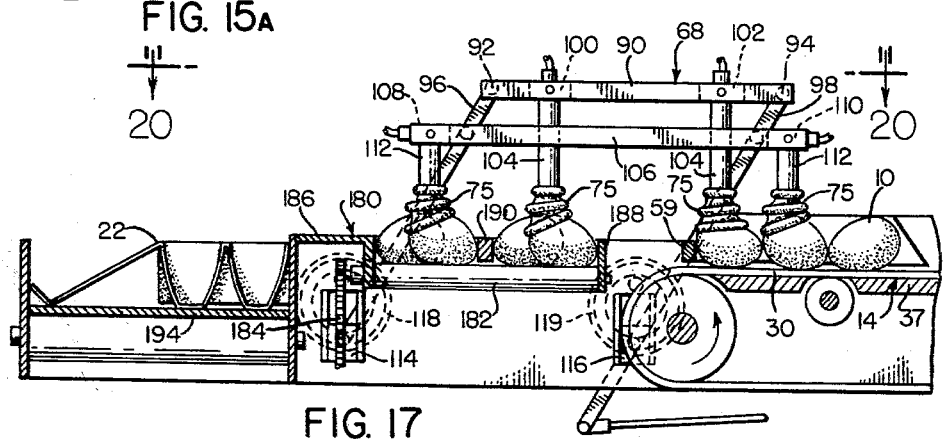
FIG. 17
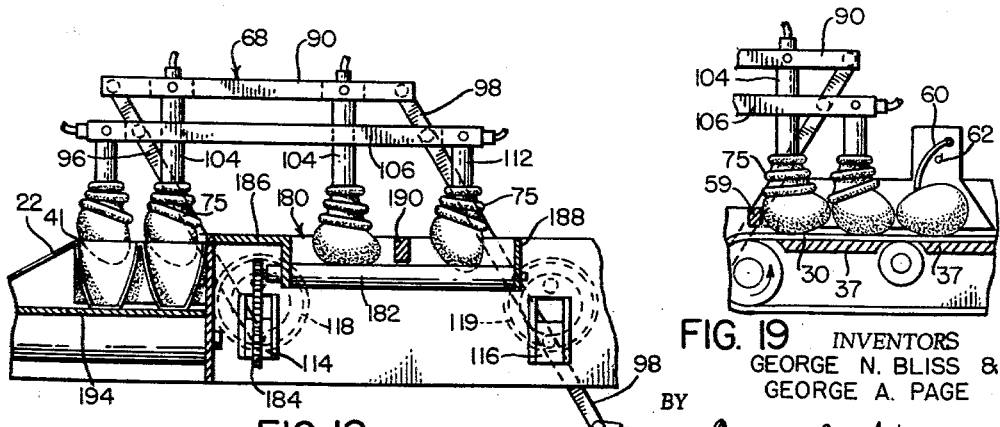
FIG. 18
FIG. 19
INVENTORS
GEORGE N. BLISS &
GEORGE A. PAGE
BY
Colman, Nord & Kraus
ATTORNEYS Feb. 16, 1965    G. N. BLISS ETAL    3,169,354
EGG HANDLING AND PACKING SYSTEM
Filed May 1, 1962    6 Sheets-Sheet 6
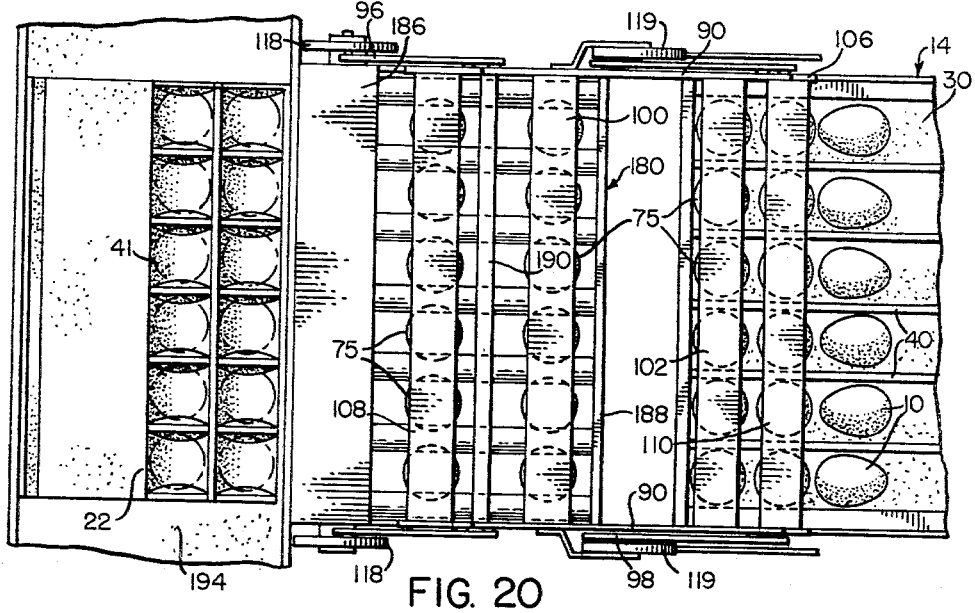
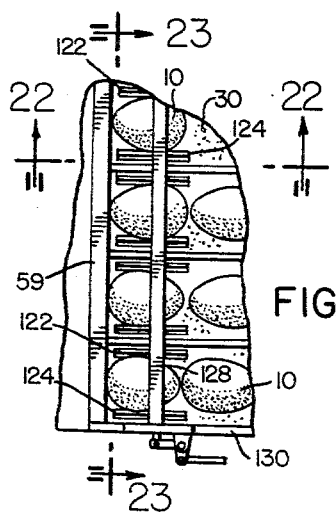
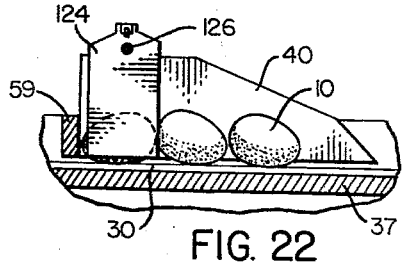
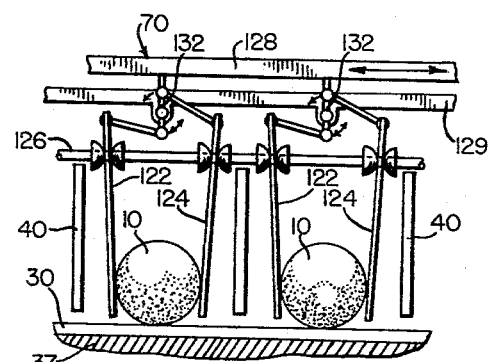
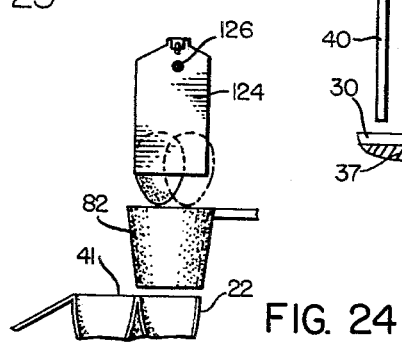
INVENTORS
GEORGE N. BLISS &
GEORGE A. PAGE
BY
Coleman, Nord & Krass
ATTORNEYS United States Patent Office 3,169,354
Patented Feb. 16, 1965

3,169,354
EGG HANDLING AND PACKING SYSTEM
George N. Bliss, Birmingham, and George A. Page, Detroit, Mich., assignors to Page-Detroit, Inc., Redford, Mich., a corporation of Michigan
Filed May 1, 1962, Ser. No. 191,501
55 Claims. (Cl. 53—61)

This invention relates to an egg handling and packing system and more particularly to a system in which eggs are handled in a plurality, automatically translated in plurality into a point-down disposition, and discharged in plurality into containers.

The invention involves a system providing a reservoir where a plurality of eggs are temporarily collected and from which they are discharged in a plurality to an end aligning device or alternatively directly to a receiving container. At the present time, most eggs, are packaged in containers having two rows of six recesses per row, making a dozen. Other containers include case trays having five rows of six recesses each, making thirty per tray. The invention provides means for charging one or more rows of a container or tray with a complete row or rows of eggs simultaneously, i.e. means for end aligning the eggs in plural, placing the eggs in a point-down attitude in plural, and discharging the eggs in plural simultaneously into the row or rows of recesses in the container or tray. Thus, the invention provides a system combination of associated devices for handling eggs in plurality, the advantages of the system combination including handling and discharging eggs in plural to achieve higher production rates, which attainment in multiple can be achieved at a slower pace than with single units and with substantially reduced breakage, lower equipment cost, less labor required per unit container loaded, and relatively lower maintenance cost.

As will be more specifically described below, the invention comprises the following principal elements associated and cooperating together to form a system for receiving eggs in plural and discharging them in plural.
The elements are:

(a) A reservoir device for receiving a plurality of eggs, and if necessary for temporarily storing the eggs in the reservoir,
(b) A device translating the eggs in plural from the reservoir to a receiving container and orienting the eggs into a point-down attitude en route, or alternatively
(c) A device translating the eggs in plural from the reservoir to an associated intermediate device which end aligns the eggs for point-down disposition to a receiving container, and
(d) A container or tray to receive the point-down eggs.

As is well recognized in the egg packing industry, eggs are best packed with their points down. The end aligning of eggs in automatic or semi-automatic equipment has long been a problem. To applicants' knowledge, a system providing the amassing of eggs in a reservoir, the end aligning of eggs simultaneously in plural and the discharge of eggs into containers simultaneously in a row, has not been done prior to applicants' invention of its system. So that each device or element performs its associated function with maximum efficiency, the inventive system embodying and associating the elements above described has been closely integrated by applicants. In the description which follows it will be noted that more than one structure can be employed for each of the elements of the system of the invention.

Briefly and generally, the system can be described as comprising a reservoir device upon which a number of eggs can be charged, stored and moved to a position at the discharge side of the reservoir, translating a number of the eggs from the reservoir simultaneously and end-aligning them, i.e. arranging the eggs with their points directed substantially downward, and discharging the eggs in plural simultaneously point-down in one or more rows to a receiving container or tray for more rapid loading of the containers or trays.

An object of the invention is to provide an egg handling and packing system having a reservoir device for a supply of eggs to be packed or packaged, which reservoir receives eggs from any source and by any means including manual charging of the reservoir, removing eggs from the reservoir in plural number simultaneously, end aligning the eggs simultaneously and discharging the eggs point-down in a row or rows simultaneously to a receiving container. Another object is to provide in such system a storage reservoir for eggs which will accommodate a substantial supply of eggs for packing or packaging. A further object is to provide in the system a device simultaneously translating a number of the eggs from the reservoir to a receiving container and orienting the eggs into a point-down attitude en route to the container. Yet another object is to provide in the system a device simultaneously translating a number of the eggs from the reservoir to an associated intermediate device which simultaneously end aligns the eggs, and simultaneously drops them in a point-down attitude to receiving containers. Another object is to provide in the system a receiving container or tray for holding or containing the plural simultaneously discharged point-down eggs.

These and additional objects of the invention and features of construction will become more apparent from the description given below in which the terms employed are used for purposes of description and not of limitation. Reference is here made to the several drawings annexed hereto and forming an integral part of this specification and in which FIGURE 1 is a perspective view of a device embodying the inventive system here disclosed.

FIGURE 15 is a fragmentary front elevational view of an alternative translating device for the structure shown in FIGURES 12 and 13.

FIGURE 15A is a side elevational view of the device shown in FIGURE 15 prior to and as it engages an egg for translation. FIGURE 15B is a side elevational view showing the translating device of FIGURE 15 as it carries the egg between stations in the system.

FIGURE 16 is a fragmentary top plan view of the structure shown in elevation in FIGURE 12, and taken substantially on the line 16—16 of FIGURE 12.

FIGURE 17 is a side elevational view, partially in section and similar to that in FIGURE 12, showing a duplex structure for translating two rows of eggs at a time from a reservoir to an end aligning device and from an end aligning device to a receiving container.

FIGURE 18 is a view similar to FIGURE 17 showing the translating device of FIGURE 17 in operation.

FIGURE 19 is a fragmentary side elevational view showing a sensing detail in the reservoir portion of the system embodying a translation device.

FIGURE 20 is a top plan view of the structure shown in FIGURE 17 and taken substantially on the line 20—20 of FIGURE 17.

FIGURE 21 is a fragmentary top plan view of an alternative mechanism for translating and end aligning eggs directly from a reservoir to a receiving container.

FIGURE 22 is a longitudinal vertical view taken substantially on the line 22—22 of FIGURE 21.

FIGURE 23 is a transverse vertical view taken substantially on the line 23—23 of FIGURE 21.

FIGURE 24 is a side elevational view of the translating device of FIGURES 21–23 inclusive shown in operation.

*General structure of the system*

Figure 1:
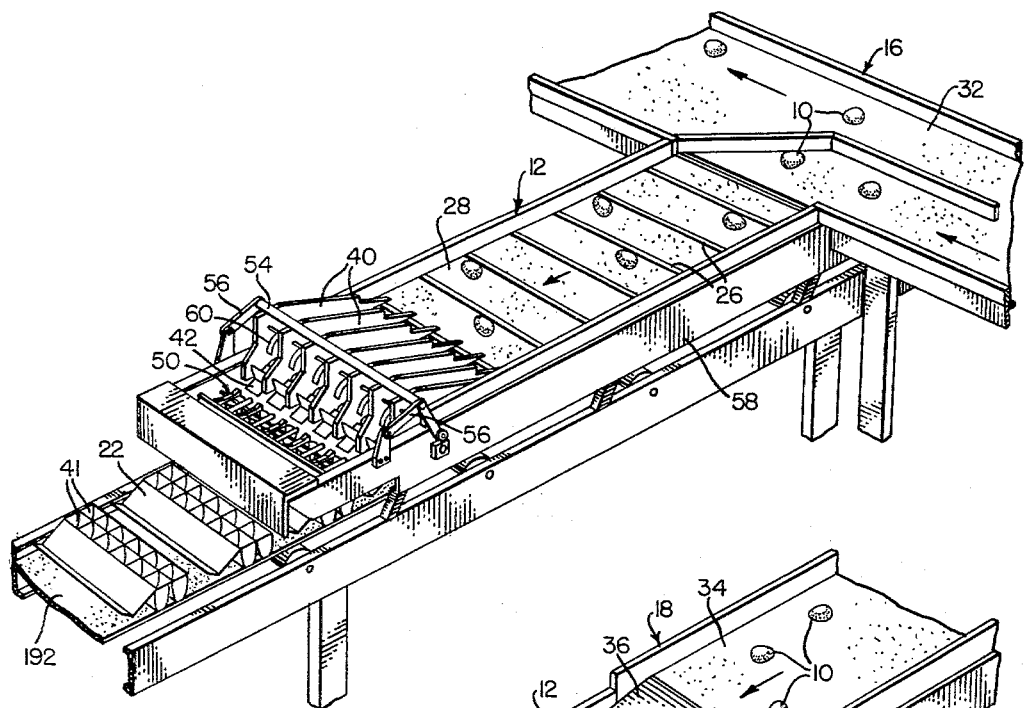
FIGURES 1A and 1B are perspective views of a container and a tray, respectively containing eggs in plural.
Figure 2:
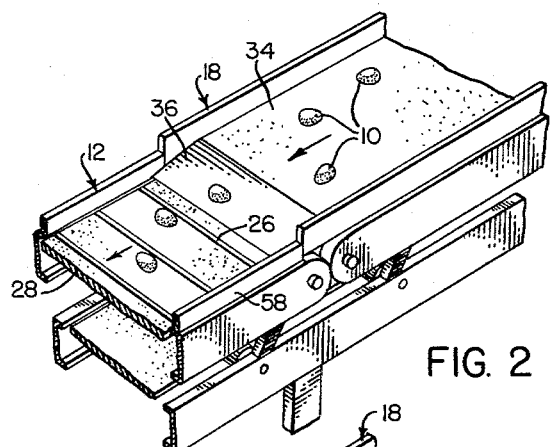
FIGURES 2, 3 and 4 are fragmentary perspective views of the reservoir and charging ends of the system.
Figure 1A:
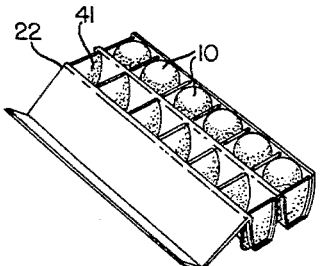
Figure 3:
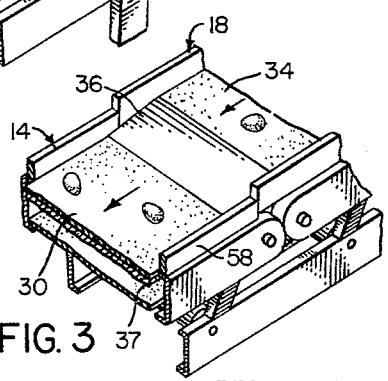
Figure 1B:
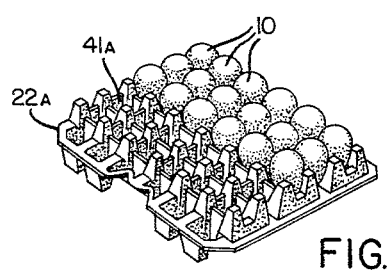
Figure 4:
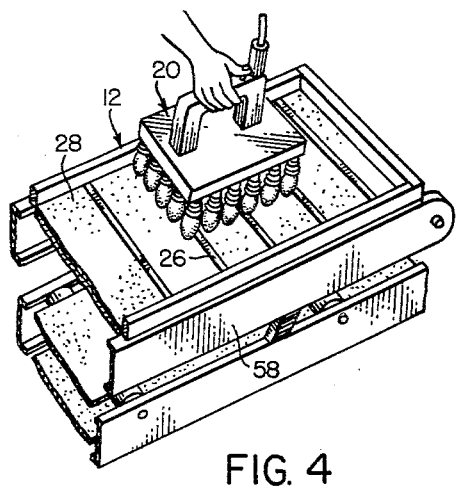
Figure 9:
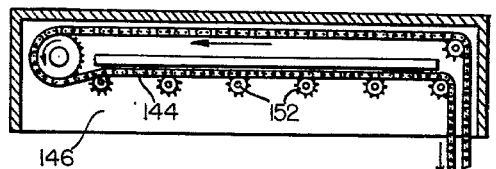
FIGURE 9 is a vertical transverse view, partially in section, taken substantially on the line 9—9 of FIGURE 7, and showing drive means for rotation of end aligning bars in that mechanism.

The inventive system here disclosed includes the following associated structures:

(a) A device in the form of a reservoir receiving a plurality of eggs 10 for temporary storage, (b) A device translating simultaneously a plural number of eggs 10 from the reservoir to a receiving container and orienting the eggs en route to a point-down attitude, or alternatively (c) A device translating simultaneously a plural number of eggs 10 from the reservoir to an end aligning mechanism which aligns the eggs for point-down disposition to a receiving container, (d) And a container or tray, or other suitable receptacle, to receive, hold or contain the plural number of point-down eggs.

Several types of reservoirs can be employed in the system, including a slat type reservoir 12 (FIGURES 1, 2, 4, 5 and 7) and a belt type reservoir 14 (FIGURES 3, 12, 13, 17 and 20). The slat type reservoir structure 12 is fully described in co-pending Bliss application Serial No. 136,043, filed September 5, 1961, for "Article Reservoir and Transfer System and Device." Belt type conveyors have long been in use, and in this application such conveyor is used in a reservoir structure. Other forms of reservoirs include a flexible sheet of material supported upon a belt of moving rollers as disclosed in Page et al. Patent No. 2,717,7129 issued September 13, 1955, a simple tray having either a non-moving platform or a moving platform, and such other devices as may be used and useful to maintain a store of eggs 10 supplied to the reservoir device.

The reservoir, whatever form it may take, can be supplied with eggs 10 by way of a transverse belt conveyor 16, an aligned belt conveyor 18, a manually operated suction pickup and discharge device 20, or any other suitable and practical means to load eggs upon the reservoir.

The purposes and functions of an egg reservoir include among others the temporary accumulation of eggs in a mass without damage at a rate independent of the rate at which eggs are charged onto the reservoir or the rate at which eggs are taken from the reservoir. Reference is made to the aforementioned Bliss application Serial No. 136,043 for a more detailed description of the features and functions of the article reservoir 12.

Operatively and functionally associated with the reservoir is a translating device taking eggs in plural number simultaneously and moving them either to an end aligning device where the eggs are end aligned for simultaneous discharge in a point-down attitude to receiving containers 22 or trays 22A or other suitable receptacles, or directly to the containers.

In the system including an end aligning mechanism, reference is made to our co-pending patent applications Serial No. 178,160, filed March 7, 1962, now Patent No. 3,118,548 and Serial No. 190,693, filed April 27, 1962. In the disclosures of these applications full descriptions of structures performing an end aligning function are given. At least one of such structures has been associated and has performed very satisfactorily in combination with a reservoir to provide a utility not before known in the egg industry, namely the simultaneous translation of a plural number of eggs from an accumulation reservoir to an end aligner where such eggs are simultaneously end aligned and from which they are simultaneously discharged in point-down attitude to the receiving container 22, filling an entire row of a 2 x 6 carton simultaneously, as a representative example of the functional performance of such combination and system.

Such system and variations in the devices or structures forming and performing in such system comprise the disclosure of this application for Letters Patent.

The translating devices include a series of paddle wheels arranged in parallel upon a common shaft, as shown in FIGURES 5, 6, 7, 10 and 11, a double row series of parallel suction type flexible pickup cups or nipples arranged to simultaneously pickup eggs from the reservoir and from the end aligning mechanism and translate them simultaneously with one row of the pickup cups, from the reservoir to the end aligning mechanism and, with the second row of pickup cups, from the end aligning mechanisms to a receiving container 22, as shown in FIGURES 12, 13, 14, 15 and 16, a duplex device of two double rows of parallel suction type flexible pickup cups to simultaneously move two rows of eggs from the reservoir and the end aligning mechanism to the end aligning mechanism and the receiving container whereby a container having two 2 x 6 rows can be filled in a single translation operation, as shown in FIGURES 17, 18, 19 and 20, and a single or multiple row device having parallel depending spaced plates which engage a plural number of eggs in the reservoir, pick them up and end align the eggs between the plates in a point-down attitude, move them simultaneously by the row of plates to a receiving container, and release them from the plates into the container, as shown in FIGURES 21, 22, 23 and 24.

*The egg reservoir*

The purposes and functions of the egg reservoir in the system here disclosed include receiving eggs 10 from any source of supply, as for instance the transverse conveyor 16, the aligned conveyor 18, the suction pickup device 20, or other device, and moving the eggs from their entry position in the reservoir to a discharge position. Such movement or translation can be accomplished by the longitudinally moving transverse spaced slats 26 which roll the eggs 10 along the surface of a non-moving platform 28, as fully disclosed and described in Bliss application Serial No. 136,043. Or, a moving egg transporting belt 30 can carry the eggs 10 the length of the reservoir 14 to discharge position.

Charging of the reservoirs is accomplished by an egg transporting belt 32 in transverse conveyor 16, or belt 34 in aligned conveyor 18, or the suction pickup device 20, or manually. A ramp 36 can be interposed between the conveyor belts and the reservoirs, if desirable or required. Belts such as 30, 32 or 34 are usually of the endless type and are drawn upon and by rollers across supporting platforms 37 mounted in the reservoir framing.

Figure 6:
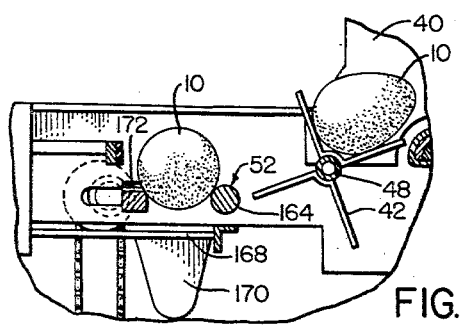
FIGURE 6 is a vertical sectional view taken substantially on the line 6—6 of FIGURE 5.
Figure 5:
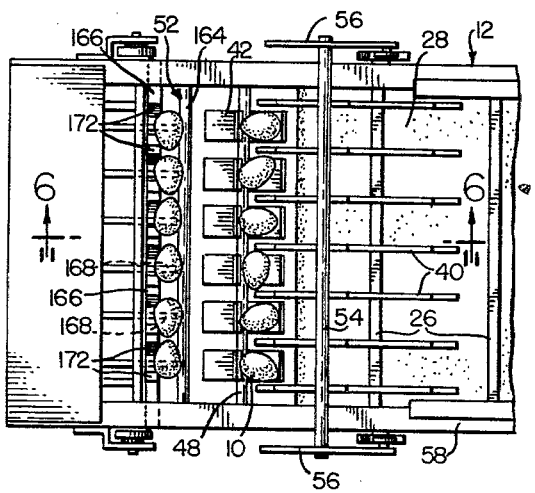
FIGURE 5 is a top plan view of the discharge end of a reservoir with associated end aligning mechanism.
Figure 7:
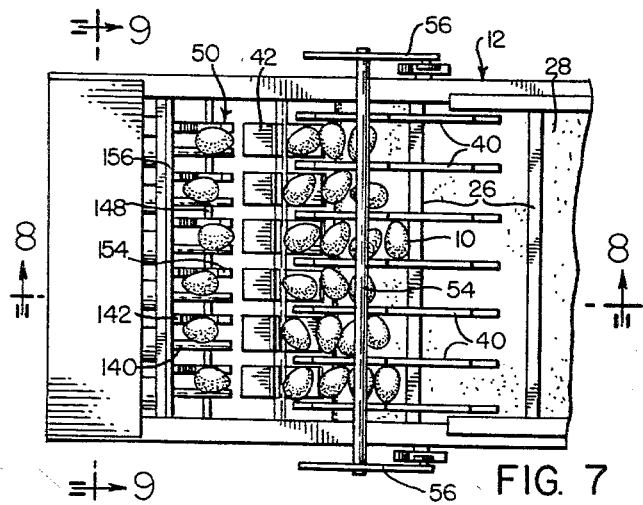
FIGURE 7 is a top plan view, similar to that in FIGURE 5, but showing a variation of the associated end aligning mechanism.
Figure 10:
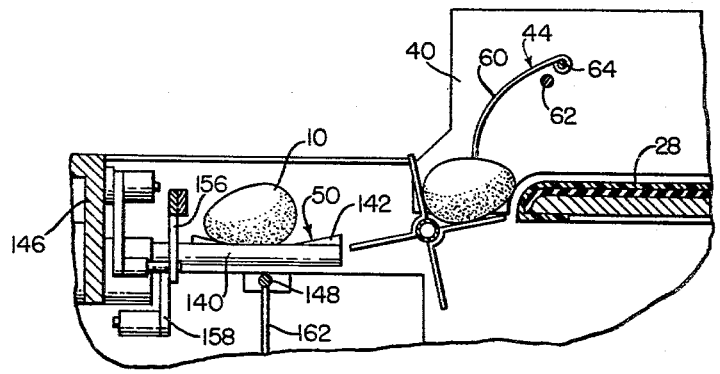
FIGURE 10 is a fragmentary vertical longitudinal sectional view, partially in elevation, showing the discharge end of the reservoir, a device for translating eggs from the reservoir to an end aligning mechanism, and a sensor to actuate the movement of eggs via the translating device and their discharge from the end aligning mechanisms.
Figure 11:
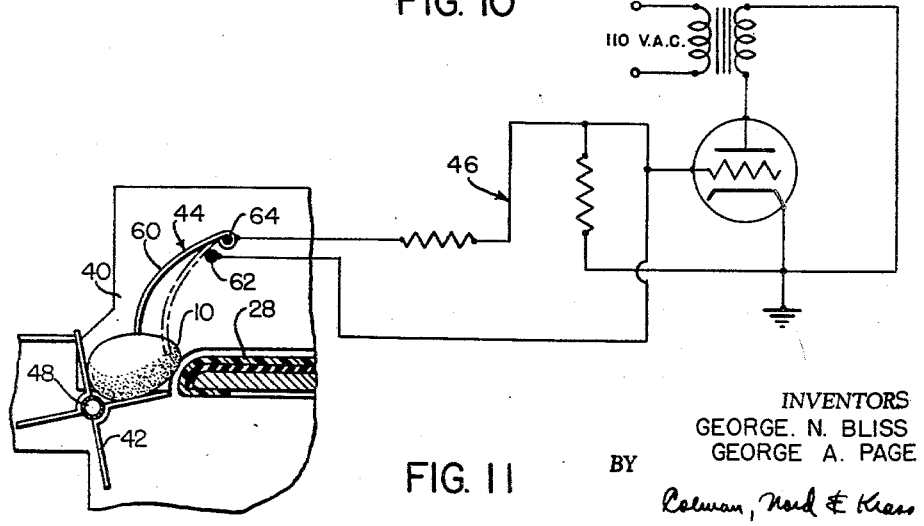
FIGURE 11 is a fragmentary vertical sectional view, partially in elevation, similar to that in FIGURE 10, in combination with a wiring diagram to show the sensing mechanism for simultaneous translation of eggs from the discharge end of the reservoir to the end aligning mechanism.
Figure 12:
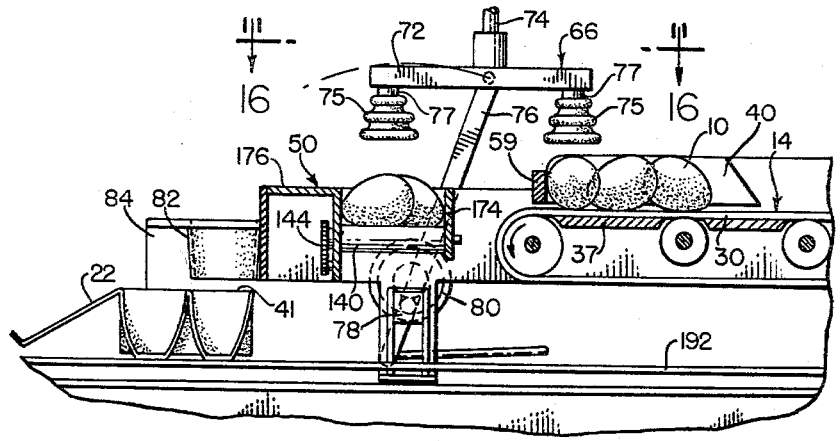
FIGURE 12 is a side elevational view, partially in section, of a structure embodying an egg reservoir and a device for translating eggs from the reservoir to an end-aligning device and to a receiving container.
Figure 13:
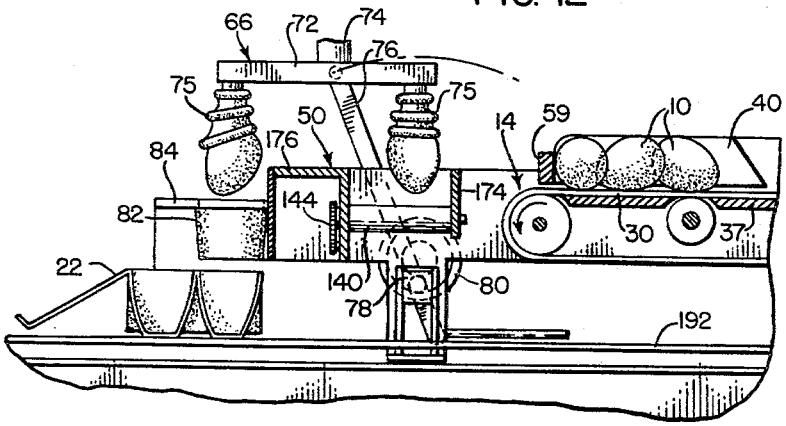
FIGURE 13 is a view similar to FIGURE 12 showing the translating device of FIGURE 12 in operation.

The discharge end of reservoir 12 or 14, as the case may be, is provided with a set of parallel spaced gateway separator plates 40 by which the eggs 10 are divided into a row of eggs corresponding to the plural number of the container or tray recesses 41 or 41A, respectively, toward and to which they will be translated after they leave the reservoir. The discharge end of the reservoir 12, as seen in FIGURES 5 and 7, comprises a parallel series of paddle wheels 42, one for each of the gateways provided by the separator plates 40. The eggs 10 roll onto the exposed quadrant of the paddle wheels facing the reservoir and between the separator plates. A series of electrically operated switches 44 maintain a closed circuit 46, diagrammatically shown in FIGURE 11, until each of the paddle wheels has an egg thereon. When the entire row is loaded, the circuit opens and actuates a drive that rotates the paddle wheels on their common shaft 48 for a 90° turn, discharging the eggs in plural onto the end aligning mechanisms 50 as shown in FIGURES 7 and 10, or the end aligning mechanisms 52 as shown in FIGURES 5 and 6.

The separator plates 40 are suspended in spaced parallel relationship above the reservoir platform 28 or belt 30, as the case may be, by a transverse bar member 54 secured at each end to levers 56 mounted on the reservoir framing 58. The plates are each long enough to admit several eggs into the gateways formed by the plates, and it is preferred to have the plates spaced apart from each other at a distance such that the plates are aligned with the dividers for recesses 41 in the container 22 or to accommodate the receiving recesses 41A in trays 22A, or other desired receptable for eggs in multiple and in rows. Such alignment simplifies the translation equipment required to translate eggs in plural simultaneously as disclosed in the system of this application. At the same time such alignment of the plates causes the eggs 10 to orient themselves in alignment with the container recesses 41 instead of transversely to the alignment of the container recesses. Such orientation of the eggs, wherein they are longitudinally disposed in line with the container recesses, further simplifies their translation from the reservoir to the container.

In the system embodying any of the translation devices shown in FIGURES 12–24 inclusive, the egg reservoirs 12 and 14 preferably terminate at their discharge ends in a bar stop 59 which restricts the eggs against forward movement, as the slats 26 of reservoir 12 or the conveyor belt 30 of reservoir 14 slips under the eggs leaving them accumulated in the gateways of the reservoir between the separator plates 40. By placing the plates 40 in relatively close spaced relationship, i.e. aligned with the dividers of the carton or tray recesses, eggs 10 pass into the gateways in substantial alignment with the container recesses so that translation is simplified and positive.

*Translation devices*

As above described, one of the translation devices carrying eggs 10 from a reservoir is the series of aligned parallel paddle wheels 42 mounted on the common shaft 48. Power means (not shown), associatedly connected to the shaft, rotate the shaft so that the paddle wheels 42 turn 90° at a time. The actuating circuit 46 includes a series of parallel switches 44, one for each gateway, each switch having a bar contactor 60 and a second bar member 62. Current is passed through a shaft 64 which swingingly supports the bar contactors 60, the current passing to the bar member 62. When one of the contactors 60 is raised from contact with member 62, the circuit is maintained in closed state by any one of the remaining contactors 60 in the several gateways of the reservoir. But when all of the contactors 60 are raised from engagement with bar member 62 by eggs 10 which are moved along the reservoir gateways and onto the paddle wheels 42, the circuit 46 is opened and the power means to rotate shaft 48 is electrically energized. When shaft 48 turns its prearranged 90°, eggs 10 on all of the paddle wheels 42 slide off and land in substantially aligned orientation upon the end aligning mechanisms 50.

The end aligning mechanism 50 and its alternative form 52 are fully described in Bliss-Page application Serial No. 178,160. These mechanisms will be described generally hereinafter below. The end aligning mechanisms comprise supplementary to the translating devices and function to arrange the eggs in end alignment so that upon discharge from such mechanisms they will arrive in the container 22 or the tray 22A in point-down disposition.

Other translating devices include the suction pickup and carrier 66, the duplex suction pickup and carrier 68, and the plate carrier 70. These carrier devices are alternative embodiments of a translation structure performing the function of picking up a plurality of eggs disposed at the discharge end of a reservoir, removing them from the reservoir and depositing them on end aligning mechanisms 50 or 52 or directly into the containers 22 or upon trays 22A. It will be understood that the translation devices here described are representative examples of devices performing the function of taking eggs from a reservoir and placing them on end aligners or directly into containers.

The suction pickup and carrier 66 comprises a suction member 72 arranged transversely of the reservoir and provided with a suction conduit 74 connected to the member 72, which is preferably hollow or at least provided with passageways, supporting a plurality of flexible compressible resilient rubber suction pickup nipples 75 depending from tubular posts 77 and arranged in parallel rows of two nipples per row, each row in alignment with a reservoir gateway, an end aligning mechanism 50, and a container recess 41. The nipples are each conduit-connected to the suction conduit 74 which leads to a suction pump (not shown). Transverse rows of nipples 75, one row at the rearward side of the member 72 and initially disposed over the eggs in the reservoir adjacent the bar stop 59 and a second row at the forward side of the member 72 and initially disposed over the eggs on the end aligning mechanisms 50, pick up a plural number of eggs in two rows simultaneously and translate them to secondary stations. The rearward row of suction nipples lift the eggs at the reservoir bar stop 59 and translate them to the end aligners 50 and the forward row lift the eggs from the end aligners and move them to the container 22, both rows of suction nipples functioning simultaneously. The member 72 is pivotally supported at its two side ends on lever arms 76 pivotally mounted in guided slides 78 and operated by a drive wheel or gear 80 that first raises the slides in their guides and then rotates the lever arms to swing the member 72 from its initial pickup position to its discharge position. At discharge, the eggs in the rearward row come to engagement with and upon the end aligners 50 and if not fully at rest thereon merely pivot or roll onto the end aligner bars, the eggs supported by the forward row of suction nipples are disposed substantially in point-down attitude over the container recesses 41. To assist in maintaining the point-down attitude in their drop at release from the nipples 75, a downwardly tapered tube 82 is suspended in parallel series from a support arm or bracket 84 mounted upon the end aligner framing so that the released eggs are restricted against rotation as they fall to the container recesses 41.

Figure 14:
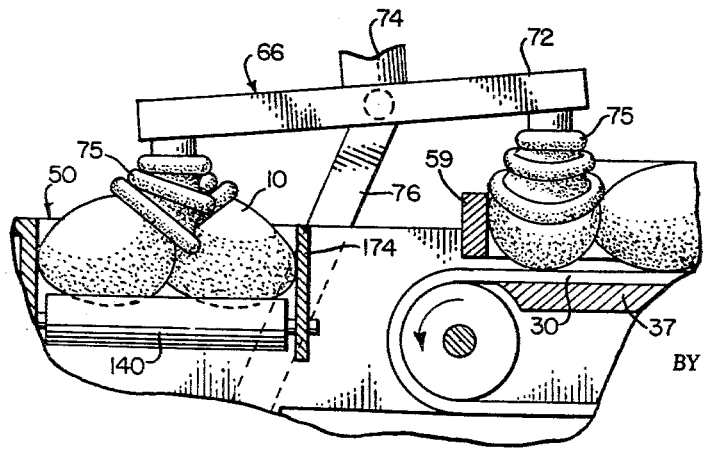
FIGURE 14 is an enlarged view of a portion of the translating device illustrated in FIGURES 12 and 13.

As shown in enlarged view in FIGURE 14, the suction pickup nipples 75 comprise a flexible resilient beaded tapering cup of light relatively soft rubber material that engages and grips an egg by its shell upon the withdrawal of air from the suction member 72. The nipple is flexible enough to bend around the surface of the egg in whatever direction force is applied as the nipple comes into engagement with the egg shell upon lowering of the member 72. The egg, being heavier toward its pointed end, will tilt and pivot downwardly upon elevation by its enlarged and lighter end, the flexible nipple yielding and distorting under the gravity pull of the egg mass which is substantially in the pointed end of the egg. Thus, the translating device embodying nipples 75 can also serve to transport eggs directly from the reservoir to the container without stopping at an intermediate station for end alignment. The tapering guide tubes 82 ensure the point-down position of the eggs dropped therethrough from such nipples.

Although the translating device 66 is illustrated in FIGURES 12, 13, 14 and 16 as transporting eggs from the reservoir to the end aligning mechanism 50 and simultaneously from the end aligning mechanism to the container 22, it will be understood that only a single transverse row of nipples 75 are required to pick up a row of eggs lying in the gateways of the reservoir adjacent the bar stop 59, transport them by member 72 and arms 80 directly to a position over a row of container recesses 41, whereupon the suction device 66 is operated to admit air to the suction system releasing the eggs from the nipples 75 in a row so that they drop into the recesses 41. It will also be understood that a duplex device having a multiple of rows of nipples can be mounted in the member 72 to pick up eggs from the gateways of the reservoir and transport them directly to a position for discharge into a container or tray, completely charging such container or tray with eggs.

A modification of the form and construction of the nipples 75 is that shown in FIGURES 15, 15A and 15B. The bell shaped suction pickup nipples 86 are provided with a substantially semi-spherical body secured upon a tubular post 87 conduit-connected to a pivoting arm 83 permitting the nipple to pivot and swing about the egg. Such a nipple 86 appears to be particularly adapted for use with eggs arranged, in the reservoirs gateways or upon the end aligners, in a longitudinal orientation, i.e. with their points directed substantially parallel to the axis of the end aligners or to the direction of the gateways. In such event, the nipple 86 attaches itself substantially to the larger end of the egg which when elevated assumes the point-down attitude shown in FIGURE 15B.

The duplex suction pickup and carrier 68 is in almost all essential respects similar to the construction for the carrier 66. However, the carrier 68 comprises a first unit of two pickup rows or suction nipples 75 on one pair of support bars and a second unit of two pickup rows on a second pair of support bars, both sets of bars being lever connected for translation of the eggs in duplex rows. The first of the pickup units comprises the lateral end support bars 90 pivotally connect at 92, 94 to levers 96, 98. The bars 90 are secured to transverse suction members 100, 102 conduit-connected to depending tubular post 104 terminating in the suction pickup nipples 75 (or 86 as desired or required). The second pickup unit is similarly constructed and has lateral support bars 106 at each end of suction members 108, 110 conduit-connected to depending tubular post 112 terminating in the suction pickup nipples 75 and are pivotally supported on 96, 98 which are pivotally mounted and guided on slides 114, 116 which move vertically and swing as drive wheels 118, 119 rotate, causing the nipples to first move upwardly from their pickup positions and then to swing to their positions of discharge where the eggs are released upon admission of air to the suction system. In the duplex carrier 68 means for translating two rows of eggs from the reservoir and from the end aligners is provided, so that a conventional 2 x 6 container 22 can be fully charged with eggs at a single translation of the carrier.

It will be noted that by the lever connections shown in FIGURES 17 and 18, the nipple posts 104 of the first unit are disposed between the nipple posts 112 of the second unit. The reservoir pickup post 104 is positioned adjacent the reservoir pickup post 112 when in pickup position, the complementary post 104 being positioned at a greater distance from the complementary post 112 in order to accommodate the spaced distance between eggs on the end aligners. When the forward translation has been made, the reservoir pickup post 104 is now at a greater distance from the reservoir pickup post 112 at the end aligners, and the complementary pickup posts are closer together at the container recesses 41. Upon return, the posts separate at the left side of the carrier 68 and become more closely adjacent at the right side of the carrier, as seen in FIGURE 17.

The sensing switches and their contactors 60 can be positioned at any point in the gateways of the reservoir to control the operation of the suction pickup and carriers, whereby the admission of one, two, three or more eggs in each gateway can be sensed before all of the switches open to actuate the pickup and translation of the eggs. One such arrangement is illustrated in FIGURE 19.

Another translation device is the plate pickup and carrier 70, FIGURES 21–24 inclusive, which comprises, in a parallel series corresponding to the number of gateways in the reservoir, multiple pairs of pickup plates 122, 124 pivotally secured to the support bar 126, actuated by the superposed bar 128, and translated by the pivot bar 129. These latter bars are movably mounted in side members 130 which are elevated and rotated by translating levers, slides and mechanisms similar to that used with the carriers 66 and 68. Each pair of plates are toggle connected for rotation toward and away from each other by toggle linkage 132 which is mechanically operated on pivot bar 129 to swing the plates 122 and 124 upon their support bars 126 and 128 respectively, whereby the plates when they engage and pick up the egg disposed substantially longitudinally in the gateway between the separator plates 40 are inclined at their lower ends slightly toward each other. The egg is lifted from the gateway and, being suspended by the plates across its larger diameter, turns and pivots so that its heavier and pointed end is directed substantially downwardly. The act of elevation by the plates performs the function of end aligning the egg into a point-down attitude ready for discharge into a container recess, as shown in FIGURE 24.

The pickup plates 122, 124 are relatively thin and can be made of metal or plastic materials. They slide down between the gateway plates 40 and on either side of the egg 10 to engage the egg at its larger diameter upon their closing in toward each other. To release the egg for discharge to the container, the toggle 132 is actuated in reverse swinging the plates away from each other and allowing the egg to fall in point-down disposition through the guide tube 82 or directly to the container recess 41. Because the eggs in the gateways may be pointed in directions toward or away from the container, they are picked up at one end or the other of the plates, and it would therefore be desirable to employ a guide tube 82 to restrict the eggs against rotation from their point-down attitudes as they drop into the container 22 or tray 22A.

End aligning mechanisms

Apart from such end aligning of eggs 10 as can be accomplished by the translation devices 66, 68 and 70, the inventive system provides for end aligning mechanisms 50 and 52, where required or desired, as associated elements with the reservoirs and the receiving carton 22 or tray 22A. Such end aligning mechanisms are required where paddle wheels 42 are used, for these wheels do not elevate or transport eggs in a point-down attitude. The use of end aligning mechanisms 50 or 52 appears to be optional where translation devices 66, 68 or 70 are employed, and if used provide a positive alignment of eggs 10 longitudinally of the devices in the system for more certain disposition of eggs in a point-down attitude or for better control of such eggs in the system as they pass from element to element.

Although the structures of end aligning mechanisms 50 and 52 are fully and specifically described in our copending application Serial No. 178,160, a general description of the structures and their functions is here given. The end aligning mechanisms 50, illustrated in FIGURES 1, 7, 8, 8A, and 10 each comprise a rotatable support bar 140, a spaced parallel non-rotating support bar 142, chain drive means 144 associatedly connected to the bars 140 to rotate them, a support member 146 for the bars fixedly mounted thereon and adapted to move the support bars 142 simultaneously further apart from the rotatable bars 140, allowing the eggs supported thereon to fall therebetween to a transverse bar member 148 upon which the egg tilts and pivots and falls toward and between guide chutes 150, 150 for point-down disposition into the container recess 41.

Figure 8:
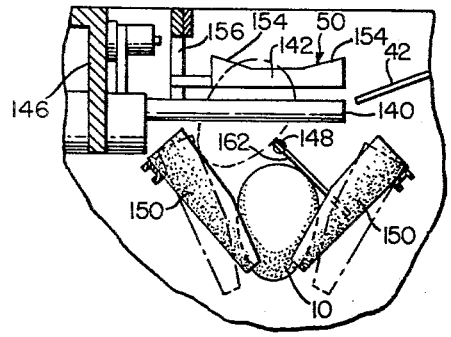
FIGURE 8 is a vertical view, partially in section, taken substantially on the line 8—8 of FIGURE 7, and showing the associated end aligning mechanism with discharge chutes for guiding the eggs to a receiving container.
Figure 8A:
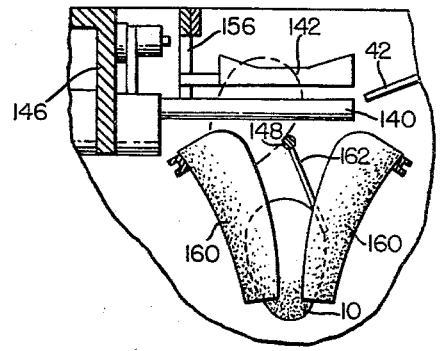
FIGURE 8A is a vertical view similar to that in FIGURE 8, and showing a variation in the egg discharge chutes to the receiving container.

To maintain the eggs upon the bars 140 and 142 as bar 140 is rotated at its driven gear 152 by drive chain 144, a pair of spaced ramps or stops 154 are disposed on the non-rotating bar 142, between which stops the egg is positioned as it slides from paddle wheel 42. Upon rotation of bar 140, the egg is frictionally engaged and driven toward one or the other of the ramp stops 154 where it comes to a halt in spite of any further urging by bar 140. In such position at the ramp stop, the egg is off-center with respect to transverse bar 148, which is disposed therebelow and substantially central of the free, clear space between the ramps 154. When the support plate 156 mounting the non-rotating bars 142 is swung by lever 158 so that the egg supporting relationship of the bars 140 and 142 is eliminated, the egg 10 falls against the transverse bar 148 (FIGURES 8 and 8A), pivots over the bar, slips into one of the guide chutes 150 and is brought to a pause by and between the chutes 150, 150 (FIGURE 8). Such chutes are arranged to swing away from each other (broken lines, FIGURE 8) and egg 10 falls free in point-down attitude into container recess 41. Where fixed chutes 160, 160 are used (FIGURE 8A), they are spaced apart sufficiently at their lower discharge ends to pass an egg therebetween to a container therebelow. A swing plate 162 pivotally mounted on transverse bar member 148, assists in restricting rotation of the egg as it slides into the chutes.

An alternate form of end aligner is the mechanism 52 (FIGURES 5 and 6), in which a single transverse rotatable bar 164 is disposed in parallel spaced relationship with a movable non-rotating bar 166. Both bars are mounted on the end aligner framing, bar 166 being slidable laterally with respect to rotatable bar 164 in order to enlarge the space therebetween and permit the eggs to drop simultaneously against transverse bars 168 pivotally mounting swing plates 170. Pairs of spaced ramps 172, 172 are located along the bar 166 to provide intermediate clear portions in alignment with the paddle wheels 42 which deposit the eggs thereon in their 90° rotation.

Either of the end aligning mechanisms 50 and 52 can be used with any of the translation devices 42, 66, 68 or 70. In the drawing FIGURES 12, 13, 14 and 16, a slightly modified structure 50 is illustrated. This modification includes a support plate 174 for the outboard ends of the rotatable bars 140, the chain drive 144 being gear connected to the driven shaft of the bar at its other end. A supportive framing 176 together with the support plate 174 mount the bars 140 and the non-movable bars 142 substantially as described above.

A further modification of the end aligning mechanisms above described is that employed in the system illustrated in FIGURES 17, 18 and 20. In this arrangement, the end aligning mechanism 180 comprises a series of parallel spaced rotatable bars 182 driven at one end by a chain drive 184 engaged upon a sprocket gear shaftmounted to the bars, a supportive framing 186, an outboard support member 188, and an intermediate separator plate member 190 arranged parallel to and substantially central between the outer plate member 190 and the framing 186. All of the egg supporting bars are rotatable bars 182, each bar being a common roller for the next adjacent bar. Thus, to end align six (6) eggs, only seven (7) bars 182 are required.

When such end aligning mechanism as is described and illustrated in FIGURES 12, 13, 14, 16, 17, 18 and 20 is employed in the system of this invention, it is not necessary to separate the rotatable and non-rotatable bars, or the rotatable bars as in mechanism 180, because eggs aligned on such mechanisms are loaded and unloaded from above. The translation devices 66, 68 and 70 come in from above the bars to charge upon and to remove eggs from the operative bars of the end aligners. In the duplex system (FIGURE 17, 18 and 20), the separator plate 190 keeps the two eggs on the bars 182 from moving out of range of the pickup nipples 75 and restricts the range of axial movement of the eggs upon the end aligning bars.

Because an egg rolls geenrally in the direction of its point, as does a cone, eggs engaged by the rotatable bars will advance upon the supportive bars in the direction of their points until they reach a stop such as the ramps 154, or the framing 176 or 186, or the support plate 174 or 188, or the intermediate separator plate 190. In such positions, the larger end of the egg is substantially central of the end aligner and the pickup nipple or plate will engage such larger end for elevation from the end aligner. Because the center of gravity of the egg is toward the pointed end, the egg assumes and tends to assume a point-down attitude as it is elevated by its larger end.

The function of each of the end aligning mechanisms in the system of this invention is to orient eggs which are placed on the end aligners in an attitude such that the main axis of the egg (its longitudinal axis) is substantially parallel with the end aligning bars. When thus oriented, the eggs assume a point-down attitude as they fall and drop against the transverse bars 148 or 168, or as they are elevated by suction nipples 75 or 86, or the pickup plates 122 and 124.

*Egg containers*

The container 22, a 2 x 6 unit, is a representative example of containers presently in use in most commercial egg packaging installations preparing eggs for the consumer market. Trays 22A, a 5 x 6 unit, generally is used in cases holding thirty (30) dozen eggs for commercial use.

At the present time consideration is being given to the use of 6 x 8 trays for special commercial packing cases, and it is to be understood that a system employing devices to pack such trays comes within the scope of the invention here disclosed.

The cartons or trays can be carried upon belt conveyors or by any other suitable means or mechanism which the user of the system elects to employ. In the system as described above and illustrated in the drawings, the cartons 22, or trays 22A, are carried on longitudinally aligned belt conveyors 192 or on transversely arranged belt conveyors 194. Where the belt conveyors 192 are used (FIGURES 1, 12 and 13), the conveyors carry filled containers of eggs under the end aligning or translation devices and the reservoir. Transversely arranged container conveyors 194 are generally at or near the level of the end aligners and reservoir (FIGURES 17 and 18).

*Operation*

The inventive system is operated in the following manner, it being understood that any one of the reservoirs herein disclosed may be used and that any one of the translating devices may be employed. However, the use of any particular reservoir or any particular end aligning mechanism or any particular translating device will generally require a complementary associated element. The purpose in providing the variations in each of the principal elements comprising the system of this invention in this disclosure is to show how broad and comprehensive the system actually is. The system has been put to the test of commercial practice and has performed its function to the satisfaction of those who have been long active in the egg handling and packing industry. This function involves receiving eggs in plural number upon an egg reservoir or temporary storage device, removing the eggs in plural number simultaneously from the reservoir and end aligning the eggs either by an end aligning mechanism or by the translation device which removes the eggs from the reservoir, and discharging the plural end aligned eggs point-down into receiving containers or trays.

As an example of the system in operation, eggs 10 are charged onto the reservoir 12 or 14 from a conveyor 16 or 18 or from a suction pickup device 20. The reservoir 12 is provided with transverse slats that roll eggs on the stationary platform 28 to its discharge end adjacent the end aligners. In the case of reservoir 14, the belt conveyor 30 carries the eggs to the bar stop 59 where the eggs accummulate. In either reservoir, the eggs align themselves in gateways formed by separator plates 40. Sensing switches 44 sense the presence of eggs in each of the gateways and when circuit 46 is broken by the opening of every switch 44 the circuit energizes a drive mechanism (not shown) that either rotates the paddle wheels 42 a 90° turn, or actuates the suction pickup and carrier 66 or 68, or the plate pickup carrier 70.

The translation devices 42, 66, 68 or 70 perform the function of moving eggs from one position to another. In the first instance eggs are removed from the reservoir and taken either to an end aligner or to a container. In the arrangement using paddle wheels 42, the eggs are moved to end aligners 50 or 52. Where the suction or plate pickup devices are employed, end alignment can be accomplished by the simple act of elevating the egg. Once the eggs are end aligned, they are ready for discharge or removal to receiving containers 22 or trays 22A. Eggs are removed from the reservoir by the translation devices 66, 68 or 70 in plural number, and end aligned directly or upon the mechanisms illustrated in FIGURES 12, 13 and 16 or 17, 18 and 20. When end aligned on such mechanisms, the eggs are again elevated and translated by the translating devices and discharged through the guide tubes 82 to or directly into the container recesses.

The mechanisms 50 or 52 drop the eggs from between the supportive bars to transverse bar members which cause the egg to turn, tilt and pivot in the direction of its point and fall between guiding chutes into recesses 41 of a container 22.

All of these operations are accomplished with a plural number of eggs, not one at a time.

The materials used in fabricating the several components of the devices here described can be varied according to the requirements of each particular installation. In general, steel is used as a structural metal where there is no direct contact with the eggs; wood, plastic and resilient cushioning materials are recommended for use where direct contact with eggs is made. Electrical switches are preferably made of light aluminum or copper parts suitably shielded and insulated against grounding on the structure. The containers or trays presently in use are made of paperboard suitably die-cut or of molded pulpboard into shapes providing the desired number of receiving recesses. The containers 22 as shown are made of fabricated paperboard, the tray 22A being made of molded pulpboard. Containers 22 are also made of pulpboard and such cartons are in common use.

Having described the inventive system in its simplest terms, it will be understood that the features of construction and the process of operation can be changed and varied in greater or lesser degree without departing from the essence of the invention defined in the appended claims.

We claim:
1. In a system for handling and packing eggs in plural numbers,
   a reservoir for temporary storage of said eggs in plural number having means to move said eggs from their position of entry into said reservoir to a position for discharge from said reservoir,
   means for charging said reservoir with eggs,
   means temporarily restricting said eggs against discharge from said reservoir until a predetermined number of said eggs are accumulated at said latter means,
   means for translating said eggs simultaneously in such predetermined number from their position for discharge in said reservoir,
   means for orienting said eggs in a substantially point-down attitude following translation and removal from said reservoir,
   and means to support a container or tray to receive said point-down eggs simultaneously in said plural number upon release from said translating and orienting means.

2. In a system for handling and packing eggs in plural number,
   a reservoir for temporary storage of said eggs in plural number having means to transport said eggs from their position of entry to a position for discharge from said reservoir,
   means for charging said reservoir with eggs,
   means temporarily restricting said eggs against discharge from said reservoir until a predetermined number of said eggs are accumulated by said latter means and for translating said eggs simultaneously in such predetermined number from their position for discharge in said reservoir,
   means for orienting said eggs in a substantially point-down attitude following translation and removal from said reservoir,
   and means to support a container or tray to receive said point-down eggs simultaneously in said plural number upon release from said translating and orienting means.

3. In a system for handling and packing eggs in plural number, said system having in combination,
   a reservoir for temporary storage of said eggs having means to move said eggs from their position of entry into said reservoir to a position for discharge from said reservoir,
      said reservoir means having
         an endless series of spaced egg engaging and rolling slats disposed transversely of said reservoir,
         and means to advance said spaced slats in said reservoir from a position of entry to said reservoir to a position of discharge from said reservoir,
   means for translating said eggs simultaneously in plural number from their position for discharge in said reservoir and for orienting said eggs simultaneously in a substantially point-down attitude following removal from said reservoir, and means to support a container or tray having recesses therein to receive said point-down eggs simultaneously in said plural number upon release from said translating and orienting means.

4. In a system for handling and packing eggs in plural number, said system having in combination, a reservoir for temporary storage of said eggs having means to move said eggs from their position of entry into said reservoir to a position for discharge from said reservoir, said reservoir means having an endless egg transporting belt conveyor disposed transversely upon a reservoir platform, and roller means to advance said belt conveyor longitudinally of said reservoir from a position of entry to said reservoir to a position of discharge from said reservoir, means for translating said eggs simultaneously in plural number from their position for discharge in said reservoir and for orienting said eggs simultaneously in a substantially point-down attitude following removal from said reservoir, and means to support a contianer or tray having recesses therein to receive said point-down eggs simultaneously in said plural number upon release from said translating and orienting means.

5. The structure defined in claim 4, and in which
said translation means is adapted to receive and translate a plural number of eggs equal to the number of recesses in a single row of said container or tray,
whereby upon release of said eggs in said plural number into said recesses simultaneously a full row of said container or tray is charged with eggs.

6. The structure defined in claim 4, and in which
said translation means is adapted to receive and translate a plural number of eggs equal to the number of recesses in said container or tray,
whereby upon release of said eggs in said plural number into said recesses simultaneously said container or tray is fully charged with eggs.

7. The structure defined in claim 4, and in which said combination includes means for charging said reservoir with eggs.

8. In a system for handling and packing eggs in plural number, said system having in combination, a reservoir for temporary storage of said eggs having means to move said eggs from their position of entry into said reservoir to a position for discharge from said reservoir, means for translating said eggs simultaneously in plural number from their position for discharge in said reservoir and comprising a series of aligned paddle wheels equal in number to said plural number, means to rotate said paddle wheels simultaneously from a position accepting eggs from said reservoir to a position from which said eggs are automatically discharged from said paddle wheels, means for orienting said eggs simultaneously in plural number in a substantially point-down attitude following removal from said reservoir, and means to support a container or tray having recesses therein to receive said point-down eggs simultaneously in said plural number upon release from said translating and orienting means.

9. The structure defined in claim 8, and in which said system combination includes means for sensing the presence of an egg upon each of said paddle wheels and for actuating the rotation of said paddle wheels to discharge the eggs thereon therefrom.

10. The structure defined in claim 8, and in which
said translation means is adapted to reecive and translate a plural number of eggs equal to the number of recesses in a single row of said container or tray,
whereby upon release of said eggs in said plural number into said recesses simultaneously a full row of said container or tray is charged with eggs.

11. The structure defined in claim 8, and in which
said translation means is adapted to reecive and translate a plural number of eggs equal to the number of recesses in said container or tray,
whereby upon release of said eggs in said plural number into said recesses simultaneously said container or tray is fully charged with eggs.

12. The structure defined in claim 8, and in which said system combination includes means for charging said reservoir with eggs.

13. In a system for handling and packing eggs in plural number, said system having in combination, a reservoir for temporary storage of said eggs having means to move said eggs from their position of entry into said reservoir to a position for discharge from said reservoir, means for translating said eggs simultaneously in plural number from their position for discharge in said reservoir and for orienting said eggs simultaneously in a substantially point-down attitude following removal from said reservoir, said means for translating said eggs simultaneously in plural number comprising at least one series of aligned egg gripping and holding suction nipples equal in number to said plural number, carrier means supporting said nipples and conduit connected to said nipples, said carrier means adapted for pickup movement to said eggs in discharge position in said reservoir and for discharge movement to a position of discharge from said nipples, means to move said carrier means from said pickup position to said discharge position, and suction producing and control means conduit connected to said carrier means to effect simultaneous pickup of said eggs in plural number from said reservoir and simultaneous discharge from said nipples, said nipples adapted to orient said eggs in a substantially point-down attitude following removal from said reservoir en route to said position of discharge from said nipples, and means to support a container or tray having recesses therein to receive said point-down eggs simultaneously in said plural number upon release from said translating and orienting means.

14. The structure defined in claim 13, and in which said nipples comprise relatively thin flexible resilient cups adapted to engage and grip the large ends of said eggs.

15. The structure defined in claim 13, and in which said reservoir is provided with spaced parallel aligned separator plates at said egg discharge position defining gateways for said eggs, each of said pickup nipples being aligned with one of said gateways.

16. The structure defined in claim 15, and in which said system combination includes means for sensing the presence of an egg in each of said gateways and for actuating the pickup movement of said carrier means in each of said gateways.

17. The structure defined in claim 15, and in which said system combination includes means for sensing the presence of a plurality of eggs in each of said gateways and for actuating the pickup movement of said carrier means in each of said gateways.

18. The structure defined in claim 13, and in which said plural number is equal to the number of recesses in a single row of said container or tray, whereby upon release of said eggs in said plural number into said recesses simultaneously a full row of said container or tray is charged with eggs.

19. The structure defined in claim 13, and in which said translation means is adapted to receive and translate a plural number of eggs equal to the number of recesses in said container or tray, whereby upon release of said eggs in said plural number into said recesses simultaneously said container or tray is fully charged with eggs.

20. The structure defined in claim 13, and in which said system combination includes means for charging said reservoir with eggs.

21. The structure defined in claim 13, and in which said at least one series of aligned egg gripping and holding nipples comprises two parallel series of such nipples,
    said nipples being aligned in parallel rows in register with said eggs at discharge position in said reservoir.

22. The structure defined in claim 13, and in which said at least one series of aligned egg gripping and holding nipples comprises a plurality of parallel series of such nipples,
    said nipples being aligned in parallel rows in register with said eggs at discharge position in said reservoir.

23. In a system for handling and packing eggs in plural number, said system having in combination,
    a reservoir for temporary storage of said eggs having means to move said eggs from their position of entry into said reservoir to a position for discharge from said reservoir,
    means for translating said eggs simultaneously in plural number from their position for discharge in said reservoir and for orienting said eggs simultaneously in a substantially point-down attitude following removal from said reservoir,
        said means for translating said eggs simultaneously in plural number comprising
            at least one series of aligned egg gripping and holding parallel plates in pairs equal in number to said plural number,
            carrier means supporting said plates in pairs and adapted for pickup movement to said eggs in discharge position in said reservoir and for discharge movement to a position of discharge from said plates,
                mechanical linkage connected to said carrier means actuating each said pair of plates to pickup an egg at said discharge position in said reservoir
                    means operatively connected to said mechanical linkage to actuate said pairs of plates for pickup of said eggs and to move said carrier means from said pickup position to said discharge position and to actuate said pairs of plates for release of said eggs at said discharge position,
            said pairs of plates adapted to orient said eggs in a substantially point down attitude following removal from said reservoir en route to said position of discharge from said pairs of plates,
    and means to support a container or tray having recesses therein to receive said point-down eggs simultaneously in said plural number upon release from said translating and orienting means.

24. The structure defined in claim 23, and in which said plates comprise relatively thin flexible strips adapted to engage and grip the large ends of said eggs.

25. The structure defined in claim 23, and in which said reservoir is provided with spaced parallel aligned separator plates at said egg discharge position defining gateways for said eggs,
    each said pair of plates being aligned with one of said gateways.

26. The structure defined in claim 25, and in which said system combination includes
    means for sensing the presence of an egg in each of said gateways and for actuating the pickup movement of said pairs of plates in each of said gateways.

27. The structure defined in claim 25, and in which said system combination includes
    means for sensing the presence of a plurality of eggs in each of said gateways and for actuating the pickup movement of said pairs of plates in each of said gateways.

28. The structure defined in claim 23, and in which said translation means is adapted to receive and translate a plural number of eggs equal to the number of recesses in a single row of said container or tray, whereby upon release of said eggs in said plural number into said recesses simultaneously a full row of said container or tray is charged with eggs.

29. The structure defined in claim 23, and in which said translation means is adapted to receive and translate a plural number of eggs equal to the number of recesses in said container or tray, whereby upon release of said eggs in said plural number into said recesses simultaneously said container or tray is fully charged with eggs.

30. The structure defined in claim 23, and in which said system combination includes means for charging said reservoir with eggs.

31. The structure defined in claim 23, and in which said at least one series of aligned egg gripping and holding parallel plates in pairs comprises a plurality of such parallel series,
    said pairs of plates being aligned in parallel rows in register with said eggs at discharge position in said reservoir.

32. In a system for handling and packing eggs in plural number, said system having in combination,
    a reservoir for temporary storage of said eggs having means to move said eggs from their position of entry into said reservoir to a position for discharge from said reservoir,
    means for translating said eggs simultaneously in plural number from their position for discharge in said reservoir and for orienting said eggs simultaneously in a substantially point-down attitude following removal from said reservoir,
        said means for orienting said eggs simultaneously in a substantially point down attitude comprising
            at least one series of aligned parallel spaced egg supporting bars in pairs equal in number to said plural number for end aligning said eggs placed thereon in substantially axial alignment with said bars,
        said means for translating said eggs adapted to pickup and translate said eggs simultaneously in said plural number from said bars to a discharge position,
            means to actuate said translating means for pickup and translation from said bars to said discharge position,
            said means for translating said eggs adapted to orient said eggs in a substantially point-down attitude following removal from said bars en route to said position for discharge from said translating means, and means to support a container or tray having recesses therein to receive said point-down eggs simultaneously in said plural number upon release from said translating and orienting means.

33. The structure defined in claim 32, and in which said reservoir is provided with spaced parallel aligned separator plates at said egg discharge position defining gateways for said eggs.

34. The structure defined in claim 33, and in which said system combination includes
means for sensing the presence of an egg in each of said gateways and for actuating the pickup movement of said translating means in each of said gateways and at each of said pairs of bars.

35. The structure defined in claim 34, and in which said translation means is adapted to receive and translate a plural number of eggs equal to the number of recesses in a single row of said container or tray, whereby upon release of said eggs in said plural number into said recesses simultaneously a full row of said container or tray is charged with eggs.

36. The structure defined in claim 33, and in which said system combination includes
means for sensing the presence of a plurality of eggs in each of said gateways and for actuating the pickup movement of siad translating means in each of said gateways and at each of said pairs of bars.

37. The structure defined in claim 32, and in which said translation means is adapted to receive and translate a plural number of eggs equal to the number of recesses in said container or tray, whereby upon release of said eggs in said plural number into said recesses simultaneously said container or tray is fully charged with eggs.

38. The structure defined in claim 32, and in which said system combination includes means for charging said reservoir with eggs.

39. The structure defined in claim 32, and in which said at least one series of aligned parallel egg supporting bars in pairs comprises a plurality of such parallel series,
said pairs of bars being aligned in parallel rows in register with said eggs at discharge position in said reservoir.

40. In a system for handling and packing eggs in plural number, said system having in combination,
a reservoir for temporary storage of said eggs having means to move said eggs from their position of entry into said reservoir to a position for discharge from said reservoir,
means for translating said eggs simultaneously in plural number from their position for discharge in said reservoir and for orienting said eggs simultaneously in a substantially point-down attitude following removal from said reservoir,
said means for orienting said eggs simultaneously in a substantially point down attitude comprising
at least one series of aligned parallel spaced egg supporting bars in pairs equal in number to said plural number for end aligning said eggs placed thereon into substantially axial alignment with said bars,
egg pivoting bars disposed transversely below each pair of said bars for tilting said eggs into a point-down attitude,
means to rotate at least one of said bars in each egg supporting pair of bars to align and advance said egg along said bars to a position off center with respect to said egg pivoting bar transversely therebelow,
means for further separating said bars in each pair to drop said eggs upon said transverse bars therebelow,
means for guidnig said eggs in point-down attitude from said transverse bars, and means to support a container or tray having recesses therein to receive said point-down eggs simultaneously in said plural number upon release from said translating and orienting means.

41. The structure defined in claim 40, and in which said reservoir is provided with spaced parallel aligned separator plates at said egg discharge position defining gateways for said eggs.

42. The structure defined in claim 41, and in which said system combination includes
means for sensing the presence of an egg in each of said gateways and for actuating the pickup movement of said translating means in each of said gateways and at each of said pairs of bars.

43. The structure defined in claim 41, and in which said system combination includes
means for sensing the presence of a plurality of eggs in each of said gateways and for actuating the pickup movement of said translating means in each of said gateways and at each of said pairs of bars.

44. The structure defined in claim 40, and in which said translation means is adapted to receive and translate a plural number of eggs equal to the number of recesses in a single row of said container or tray, whereby upon release of said eggs in said plural number into said recesses simultaneously a full row of said container or tray is charged with eggs.

45. The structure defined in claim 40, and in which said translation means is adapted to receive and translate a plural number of eggs equal to the number of recesses in said container or tray, whereby upon release of said eggs in said plural number into said recesses simultaneously said container or tray is fully charged with eggs.

46. The structure defined in claim 40, and in which said system combination includes means for charging said reservoir with eggs.

47. The structure defined in claim 40, and in which said at least one series of aligned parallel egg supporting bars in pairs comprises a plurality of such parallel series,
said pairs of bars being aligned in parallel rows in register with said eggs at discharge position in said reservoir.

48. In a system for handling and packing eggs in plural number, said system having in combination,
a reservoir for temporary storage of said eggs having means to move said eggs from their position of entry into said reservoir to a position for discharge from said reservoir,
means for translating said eggs simultaneously in plural number from their position for discharge in said reservoir and for orienting said eggs simultaneously in a substantially point-down attitude following removal from said reservoir,
said means for orienting said eggs simultaneously in a substantially point down attitude comprising
at least one series of aligned parallel spaced egg supporting bars in pairs equal in number to said plural number for end aligning said eggs placed thereon into substantially axial alignment with said bars,
means to rotate at least one of said bars in each egg supporting pair of bars to align said egg with said bars, means for further separating said bars in each pair so as to allow said egg thereon to tilt, pivot and fall from between said parallel bars into a point-down attitude,
means for guiding said eggs dropped from said parallel bars in a point-down attitude,
and means to support a container or tray having recesses therein to receive said point-down eggs simultaneously in said plural number upon release from said translating and orienting means.

49. The structure defined in claim 48, and in which said reservoir is provided with spaced parallel aligned separator plates at said egg discharge position defining gateways for said eggs.

50. The structure defined in claim 49, and in which said system combination includes
means for sensing the presence of an egg in each of said gateways and for actuating the pickup movement of said translating means in each of said gateways and at each of said pairs of bars.

51. The structure defined in claim 49, and in which said system combination includes
means for sensing the presence of a plurality of eggs in each of said gateways and for actuating the pickup movement of said translating means in each of said gateways and at each of said pairs of bars.

52. The structure defined in claim 48, and in which said translation means is adapted to receive and translate a plural number of eggs equal to the number of recesses in a single row of said container or tray, whereby upon release of said eggs in said plural number into said recesses simultaneouly a full row of said container or tray is charged with eggs.

53. The structure defined in claim 48, and in which said translation means is adapted to receive and translate a plural number of eggs equal to the number of recesses in said container or tray, whereby upon release of said eggs in said plural number into said recesses simultaneously said container or tray is fully charged with eggs.

54. The structure defined in claim 48, and in which said system combination includes means for charging said reservoir with eggs.

55. The structure defined in claim 48, and in which said at least one series of aligned parallel egg supporting bars in pairs comprises a plurality of such parallel series,
said pairs of bars being aligned in parallel rows in register with said eggs at discharge position in said reservoir.

References Cited by the Examiner
UNITED STATES PATENTS

| | | | |
|---|---|---|---|
| 2,717,729 | 9/55 | Page et al. | 53—160 |
| 2,846,830 | 8/58 | Bossi | 53—246 X |
| 2,895,589 | 7/59 | Rostron | 53—147 X |
| 2,993,592 | 7/61 | Mumma | 53—246 X |
| 2,993,622 | 7/61 | Mumma | 53—246 X |
| 3,054,235 | 9/62 | Edgerly | 53—61 X |
| 3,060,660 | 10/62 | Reading | 53—246 X |

FRANK E. BAILEY, *Primary Examiner.*
BROMLEY SEELEY, *Examiner.*